Sept. 22, 1936.   H. F. PATTERSON   2,055,303
MOTOR VEHICLE POWER TRANSMISSION
Filed March 1, 1934   2 Sheets-Sheet 2

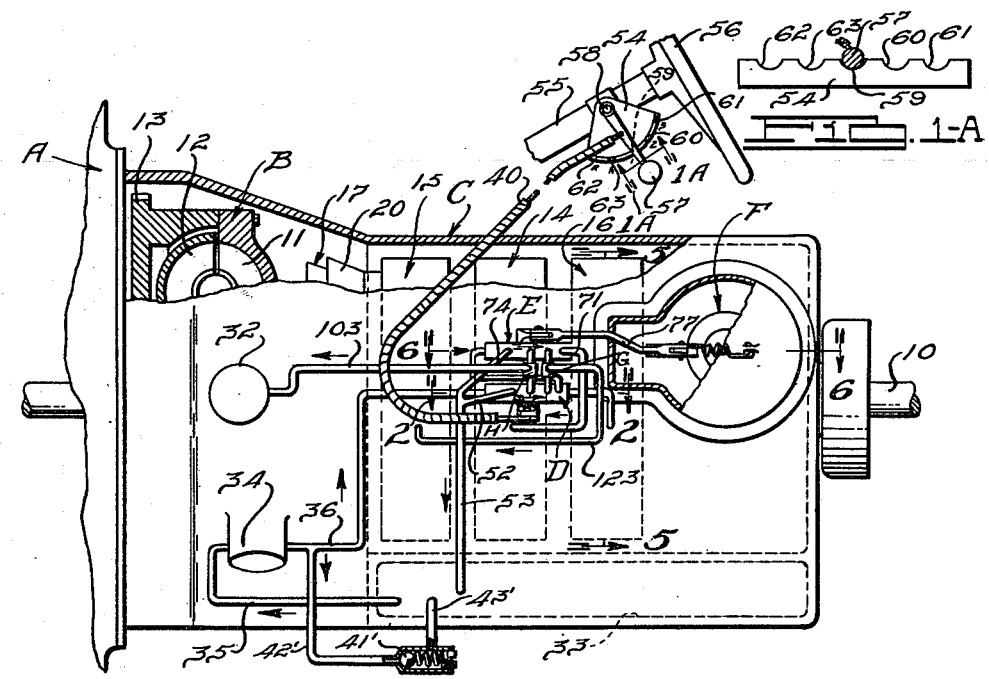

INVENTOR.
Herbert F. Patterson.
BY
ATTORNEYS.

Patented Sept. 22, 1936

2,055,303

UNITED STATES PATENT OFFICE 2,055,303

MOTOR VEHICLE POWER TRANSMISSION

Herbert F. Patterson, Detroit, Mich., assignor to Chrysler Corporation, Detroit, Mich., a corporation of Delaware

DEC 3 1 1940

Application March 1, 1934, Serial No. 713,443

18 Claims. (Cl. 74—262)

This invention relates to motor vehicles and refers more particularly to improvements in means for transmitting power to drive such vehicles.

More particularly, I have provided improvements especially adapted for varying the driving speed ratios of motor vehicles.

It is an object of my invention to provide improvements in motor vehicle transmissions and controls therefor; to provide improved means for operating the various gear trains of a transmission; and to provide relatively simple means for controlling and actuating the various gear ratios of a transmission, capable of manufacture at relatively low cost. While my invention, in the broader aspects thereof, is applicable to various types of transmissions including well-known types of countershaft gear selector transmissions, my invention is particularly related to motor vehicles having speed ratio changing transmissions of the planetary or epicyclic gear type.

A further object of my invention is to provide improved transmission controlling means, especially adapted for use with planetary transmissions, my transmission control operating to establish the various gear ratios with improved positiveness, simplicity, and efficiency.

A further object of my invention, in its more limited aspects, resides in the provision of fluid operating means of improved form and arrangement for controlling the planetary gear sets of a transmission, or other corresponding parts of other types of transmissions. In the broader aspects of my invention, the fluid pressure is preferably provided by a suitable liquid medium such as oil, but the fluid pressure medium may be air under pressure greater or less than atmospheric pressure.

A further object of my invention resides in the provision of improved means for controlling the speed ratios of a transmission, preferably of the planetary gear type, wherein changes in the speed ratios are automatically produced in response to conditions of drive through the transmission. More particularly, I have provided transmission controlling means which is automatically responsive to speeds of the motor vehicle, preferably in combination with means under control of the vehicle driver for manually controlling the action of the automatic gear ratio selecting means.

In carrying out the objects of my invention, I have provided a transmission speed ratio controlling means of the character referred to wherein the various transmission gear ratios may be effected in response to manual selection by the vehicle driver, the transmission being manipulated under power in response to the manual selection.

I have further provided means, such as a governor, responsive to speeds of the vehicle for automatically manipulating the transmission under power independently of the manual selection but preferably under control thereof. Thus, the governor controlling selector means is preferably arranged so as to be cut out or rendered ineffective in response to manual selection and the system is further arranged so that the speed responsive selector means cannot operate until the manual selector is initially set for the governor controlling action.

In one embodiment of my invention I have provided for manual selection of the transmission speed ratios at any time to greater or lesser speed ratios from any condition of vehicle drive, such manual selection being accomplished independently of the governor. However, when the low or first speed is manually selected, then where the manual selector is left in the first speed setting, the governor will respond to such first speed setting to automatically manipulate the transmission progressively upward through the higher speed ratios as the vehicle speed increases and progressively downward for vehicle decelerating speeds.

A planetary type of transmission presents a number of advantages over the more conventional sliding gear types of transmissions, and my invention is therefore primarily directed toward planetary types of transmissions and power transmission systems employing planetary gearing speed ratio controlling devices, although, as aforesaid, the fundamental principles of my invention may, if desired, be employed in connection with transmissions of other types including the aforesaid sliding gear types of transmissions. By way of example in connection with the aforesaid advantages of the planetary transmission over more conventional types, it may be noted that the planetary transmission permits gear changes without the necessity of releasing the main clutch between the engine and transmission so as to obtain relatively quick gear changes and faster acceleration of the motor vehicle. This is made possible by reason of the fact that the braking devices associated with the respective planetary gear trains are, in effect, clutches in that each rotary drum controlling a planetary gear train is frictionally engaged by its associated braking means.

Further objects and advantages of my invention will be apparent from the following detailed description of one illustrative embodiment of the principles of my invention, reference being had to the accompanying drawings, in which:

Fig. 1 is a side elevational view somewhat diagrammatically illustrating my power transmission mechanism as a whole.

Fig. 1A is a side view of the selector segment, the view being taken along line IA—IA of Fig. 1.

Fig. 2 is a sectional plan view of the manually controlled distributor valve, the section being taken along the line II—II of Fig. 1.

Fig. 3 is a sectional elevational view through one of the fluid cut-off valves located between the manually controlled distributor valve and the governor controlled distributor valve.

Fig. 4 is a detail sectional plan view illustrating the fluid cut-off valve of Fig. 3, this section being taken along the line IV—IV of Fig. 3.

Figure 5:
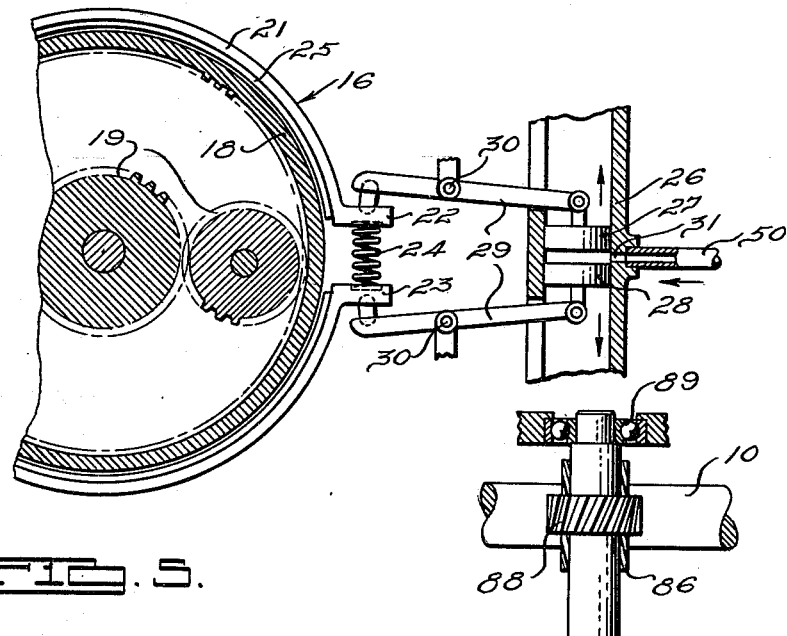
Fig. 5 is a sectional elevational view somewhat diagrammatic and illustrating one of the planetary transmission speed ratio brake controlling devices, the section being taken along the line V—V of Fig. 1.

Referring to the drawings, I have illustrated my invention in connection with a motor vehicle drive, this drive including a prime mover or engine A, a portion of which is shown in Fig. 1, a clutch B driven from the engine, and a change speed transmission or gear box C driven from the clutch B. The drive passes from the transmission through a power take-off shaft 10 which, as usual, may extend rearwardly of the vehicle to drive the usual rear ground wheels (not shown).

The clutch B may be of any suitable construction for controlling the drive between engine A and transmission C, this clutch being illustrated in Fig. 1 in the form of a fluid type having the usual driving and driven cooperating vane members 11 and 12, respectively. The driving vane member 11 is carried by the engine flywheel 13 and the driven vane member 12 is secured to the usual power shaft which extends rearwardly to transmission C, this power shaft not being illustrated. I have illustrated a fluid type of clutch since a clutch of this character has a number of advantages in connection with a transmission of the planetary gear type C. Thus, the fluid type of clutch is desirable in providing a smooth drive for the vehicle through the planetary transmission, relatively high power driving efficiency, and other well-known favorable characteristics.

I have illustrated the change speed transmission C as the epicyclic or planetary type, this general form of transmission being well-known in the art and, as usual, includes a plurality of transmission speed ratio controlling clutches or brakes 14, 15, and 16, these braking devices being respectively adapted to actuate the transmission in its first speed ratio or low gear, second speed ratio, and reverse drive.

A further controlling brake device 17 is illustrated as a cone type, this brake being adapted to control the transmission for effecting the third speed herein illustrated as the usual direct drive through the transmission.

The brake controlling devices 14, 15, and 16 are adapted to act on transmission elements associated therewith and usually embodied in the form of a rotary drum, one of which is illustrated at 18 in Fig. 5 in association with the transmission controlling brake 16 for the reverse speed. It will be understood that the various transmission controlling brakes 14, 15, and 16 may be adapted in the well-known way for causing actuation of the respective epicyclic or planetary gear trains associated therewith, one of these gear trains being somewhat diagrammatically illustrated at 19 in Fig. 5. The form and arrangement of these planetary gear trains are well-known in the art and the details thereof are omitted from my disclosure. The brake controlling device 17 is adapted according to customary practice to engage a drum 20 illustrated in Fig. 1 for effecting the direct drive in a manner well understood in the art.

The controlling brakes 14, 15 and 16 are, for the most part, similar in construction and operation and the following description of the details of the brake device 16 illustrated in Fig. 5 is typical of the other brakes. In Fig. 5 the drum 18 is normally rotated by the planetary gearing 19 associated therewith when the transmission is not in its reverse drive setting, and when rotation of drum 18 is prevented by the braking mechanism associated therewith, then the drive through the transmission takes place for the reverse gear ratio drive according to well-known practice for planetary gearings of the general type illustrated.

In order to brake the drum 18, I have provided a band 21 extending around the drum to provide ends 22 and 23 normally separated by spring 24, the band 21 being provided with a brake lining 25 adapted to contact with the drum when the ends 22 and 23 of the brake band are forced toward each other to contract the band. The band is anchored in any suitable manner not illustrated and suitable brake actuating mechanism is provided for each of the bands such as the actuating mechanism illustrated in Fig. 5 for example.

Associated with each of the brake controlling devices 14, 15 and 16 is a cylinder, one of these cylinders being illustrated at 26 in Fig. 5 in association with the brake device 16. This cylinder receives a pair of opposed pistons 27 and 28, the pistons being operably connected to actuate the respective band ends 22 and 23 by suitable links 29 pivotally supported at 30. The cylinder 26 has a fluid pressure inlet 31 adapted to admit fluid such as oil under pressure to the space between pistons 27 and 28 so as to actuate these pistons away from each other in contracting the brake band to arrest rotation of the associated controlling drum 18. When the fluid pressure is released, the spring 24 will act to space the brake band 21 from drum 18 as shown in Fig. 5, pistons 27 and 28 being also restored and the fluid pressure being displaced from the cylinder 26 by way of the opening 31.

The direct speed brake controlling device 17 is also suitably actuated by fluid pressure introduced to a cylinder illustrated at 32 in Fig. 1, it being understood that this cylinder is adapted to receive one or more pistons adapted, when actuated by fluid pressure introduced to the cylinder, to engage the cone type drum 20 to effect the third speed or direct drive through the transmission C.

In order to selectively control the supply of fluid under pressure to the actuating mechanism for the various speed ratio controlling brakes, I have provided a fluid pressure control and distributing system illustrated in somewhat diagrammatic form in Figs. 1 and 2. The transmission reservoir 33 contains a quantity of fluid such as oil, a pump indicated at 34 being suitably driven so as to draw the oil from the reservoir by a pipe or conduit 35, the oil under pressure being discharged from the pump through a high pressure conduit 36 leading to the valve casing 37 of the manually controlled distributor valve D best shown in Fig. 2, this valve being adapted for rotary manual adjustment and control by a lever 38 connected at 39 with a suitable linkage such as a Bowden wire 40. A relief valve 41' may be interposed by pipes 42' and 43' between the pressure conduit 36 and reservoir 33 so as to by-pass any excess delivery of pump 34 back to the reservoir.

The valve D cooperates with casing 37 to provide a fluid pressure supply space or chamber 41 and a low pressure space or chamber 42, these chambers being separated from each other by the radially extending valve portions 43 and 44 engaging casing 37. The supply chamber 41 delivers oil under pressure from supply conduit 36 through a passage 45 extending through the valve to an outlet 46 illustrated in Fig. 2 as registering with a conduit 47, the outlet 46 being also adapted for selective alignment with further conduits 48, 49 and 50. The casing 37 has an uninterrupted portion 51 intermediate the conduits 47 and 50 so that when the outlet 46 is adjusted opposite the portion 51, the oil in passage 45 will not escape, this position being the neutral setting of valve D.

The low pressure chamber 42 is continuously open to a conduit 52 which is arranged below the plane of oscillatory movement of outlet 46, the conduit 52 communicating with a pipe 53 illustrated in Fig. 1 as leading to the reservoir 33. During movement of valve D, the high pressure chamber 41 is continuously in communication with the oil pressure delivery conduit 36, and the low pressure chamber 42 is continuously in communication with the return conduit 52.

The manually controlled distributor valve D is adapted to be manually adjusted by the vehicle driver and in Fig. 1, I have illustrated this adjusting or selecting means as comprising a stationary selector segment 54 conveniently mounted to the steering post 55 of the vehicle steering wheel 56, the segment 54 having a plurality of releasable stops, notches, or other suitable means for advising the operator of the setting of a hand operated selector lever or element 57 pivotally mounted at 58 in association with the segment 54. Thus, the segment 54 has the notches or stops 59, 60, 61, 62, and 63 respectively adapted, when aligned with selector arm 57, to manipulate transmission C into the first speed gear ratio drive, the second speed, the third or direct speed, reverse drive, and neutral, the latter setting establishing a neutral condition in the transmission whereby there will be no drive therethrough to the take-off shaft 10. The valve D is connected for actuation by selector arm 57 by the aforesaid Bowden wire 42, which as illustrated in Fig. 1, is connected to the selector arm. Fig. 1A illustrates the notches and selector arm 57 may be resiliently sprung for movement into the notches. The springing of the arm in any notch will prevent displacement of the arm until manually moved to another notch.

In Fig. 1 it will be noted that the selector arm 57 is illustrated as being aligned with the first speed stop 59, and in Fig. 2 the valve D is shown for its position corresponding to this setting wherein the outlet 46 is in communication with the conduit 47. Likewise when the selector arm 57 is adjusted to the second speed stop 60, the valve D is moved from the position illustrated in Fig. 2 to a position establishing communication between outlet 46 and the second speed conduit 48. In similar fashion the conduit 49 is the third speed or direct conduit, conduit 50 being the reverse conduit, these conduits being respectively supplied with oil under pressure by communication with the outlet 46 when the selector arm 57 is adjusted to the stops 61 or 62. When the selector arm 57 is adjusted to the neutral stop 63, the outlet 46 of valve D is adjusted to the neutral space 51.

The reverse conduit 50 as will be noted from Figs. 1, 2 and 5 extends directly from the valve D to the reverse cylinder 26 so that when the selector arm 57 is adjusted to align the arm with stop 62 the oil under pressure is supplied from valve outlet 46, through the reverse conduit 50 so as to actuate the pistons 27 and 28 of the transmission reverse controlling brake device 16, the reverse drum 18 associated therewith having its rotation arrested so as to produce the reverse drive to the power take off shaft 10. The brake controlling reversing device 16 will continue to be actuated as long as the selector arm 57 is left in alignment with the reversing notch 62 and when the selector arm is actuated into another of its positions, the valve D will be correspondingly moved so as to open the reverse conduit 50 to the low pressure chamber 42 and this will relieve the pressure to the reversing pistons 26 and 28. When this occurs the spring 24 associated with the band 21 of the reversing brake will act to move the pistons toward each other, the oil being displaced thereby passing through the conduit 50 to the low pressure chamber 42 and then through the return pipes 52 and 53 to the reservoir 33. It will be noted that the oil is not entirely removed from cylinder 26 when the band 21 is expanded under the influence of spring 24, and only sufficient oil is thereby displaced to accommodate the inward movement of the pistons 27 and 28, it being understood that the conduit 50 and the clearance space between pistons 27 and 28 remains filled with oil up to the casing 37 of valve D. The same holds true in connection with the fluid conducting conduits and associated parts of the other transmission brake controlling devices.

When the selector arm 57 is adjusted so as to supply oil under pressure to the conduits 47, 48 and 49, the corresponding transmission brake controlling devices 14, 15 and 16 are respectively actuated although the oil under pressure is not conducted directly to these several braking devices as will be presently apparent. However, when the selector arm is manipulated for these several positions of adjustment the respective fluid pressure brake operating means are actuated in a manner similar to that just referred to hereinabove in connection with the typical operation of the transmission reverse brake controlling device 16.

Figure 6:
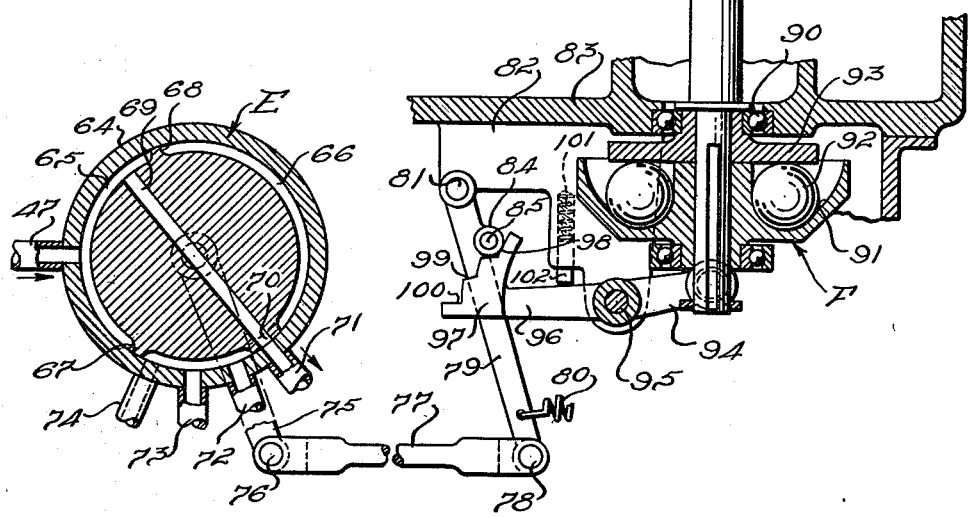
Fig. 6 is a sectional plan view of the governor controlled distributor valve showing the governor controlling mechanism associated therewith, the section being taken along the line VI—VI of Fig. 1.

Referring now to Fig. 6 it will be noted that the first speed conduit 47 leading from the manually controlled distributor valve D extends through a casing 64 to a high pressure space or chamber 65 of the governor controlled distributor valve E. The general construction and operation of the valve E is very similar with that of valve D and consists of a low pressure chamber or space 66 separated from the high pressure chamber 65 by the valve projections 67 and 68. The valve E also has a fluid pressure conduit 69 having a distributing outlet 70, the latter being adapted for selective alignment with the first speed conduit 71, second speed conduit 72, or third speed conduit 73. The casing 64 has a further conduit 74 which is continuously in communication with the low pressure chamber 66 and which serves to return surplus oil from this low pressure chamber through the aforesaid conduit 53 as shown in Fig. 1 back to the reservoir 33.

The high pressure chamber 65 is continuously in communication with the supply conduit 47 and the valve E is adapted for selective oscillatory adjustment through a lever 75 pivotally connected at 76 to a link 77, the latter being pivotally connected at 78 with a lever 79 normally urged to the right as viewed in Fig. 6 by a spring 80 so as to normally move the valve E to align the outlet 70 with the first speed conduit 71.

The lever 79 is pivotally supported at 81 to a bracket 82 forming a part of the casing 83 of transmission C, lever 79 carrying a roller 84 rotatable on a pin 85, the latter being rigidly carried by lever 79.

In Fig. 6 the power take off shaft 10 of the transmission is shown provided with a gear 86 adapted to drive a cross-shaft 87 through a gear 88 carried thereby and meshing with the gear 86, the shaft 87 being rotatably supported in spaced bearing 89 and 90. The shaft 87 projects through the casing 83 and drives a governor F which comprises the usual cup 91 splined to shaft 87. A plurality of centrifugally actuated governor balls 92 operate within cup 91 and against the reaction back plate 93, so that as the speed of shaft 10 increases, the governor F will be driven through shaft 87 proportionately, the governor balls 92 being thrown outwardly to move the cup 91 longitudinally outwardly of shaft 87. This movement of cup 91 acts on a lever 94 pivotally supported at 95, the lever having a second lever arm 96 carrying a cam 97 on its outer end.

The cam 97 has a series of spaced notches 98, 99 and 100, these notches being respectively designated as the first speed notch, second speed notch, and the third or direct speed notch. In Fig. 6 it will be noted that the roller 84 is illustrated in engagement with the first speed notch 98. In order to yieldingly urge the arm 96 to the position illustrated in Fig. 6 and also to return the governor cup 91 to its normal initial position also shown in Fig. 6, I have provided a suitable spring 101 which acts on lever arm 96 by reason of a spring actuated plunger 102.

With the parts positioned as illustrated in Fig. 6, and with the selector arm 57 also adjusted in alignment with the first speed stop 59 as shown in Fig. 1 it will be apparent that oil under pressure from pump 34 will be supplied through the valve D and conduit 47 to the high pressure chamber 65 of valve E. This high pressure oil will thus pass through the outlet 70 of valve E and thence through the first speed conduit 71 which leads directly from valve E to the fluid pressure operating device associated with the first speed brake controlling device 14 of transmission C. Thus, with the parts positioned as illustrated, the transmission C will be manipulated or set to actuate the first speed braking device 14 and the drive through the transmission will take place in the first gear ratio. Assuming that the operator leaves the selector arm 57 in the aforesaid position of adjustment at the first speed notch 59, it will be apparent that the motor vehicle will be accelerated in its first speed. As this acceleration takes place the governor balls 92 will, for a predetermined desired rotation of shaft 10, fly outwardly so as to act on the governor cup 91 to swing the cam 97 in a clockwise direction as viewed in Fig. 6, the roller 84 being moved from notch 98 to notch 99. It will be noted that the movement of roller 84 between successive notches is not a gradual movement but by reason of the abrupt cam faces between these successive notches, the cam 97 will remain in engagement with the notch 99 until the governor balls 92 finally exert sufficient force to quickly snap the cam 97 to a position for engaging notch 99 with roller 84.

When the roller 84 moves from notch 98 to notch 99 it will be apparent that lever 79 is shifted on its pivot 81 in a clockwise direction as viewed in Fig. 6 thereby moving the distributor valve from the position illustrated in Fig. 6 to a further position for aligning outlet 70 with the second speed conduit 72. It will thus be apparent that the first speed braking control device 14 will be released and, as will presently be more apparent, the second speed brake controlling device 15 will be actuated so as to establish the second speed drive through transmission C.

In a similar manner as further acceleration of the motor vehicle takes place in second speed, at the desired speed of the vehicle and the corresponding r. p. m. of shafts 10 and 87, the governor F will actuate cam 97 so as to abruptly or quickly engage the third speed notch 100 with the roller 84. This cam movement likewise moves the outlet 70 for alignment with the third speed fluid conduit 73, the second speed brake controlling device 15 being then released and the third speed brake controlling device 17 being actuated so as to establish a direct drive through transmission C.

It will be apparent that by suitably shaping the caming face of the governor cup 91 and by suitably proportioning the force exerted by governor balls 92 and the action of spring 80, the cam 97 may be made to move at any desired motor vehicle speed so that the governor will automatically and progressively manipulate the transmission into its several gear speed ratio settings.

With the motor vehicle driving in the third or direct speed in accordance with the foregoing assumed illustrative conditions of operation, let it be further assumed that the motor vehicle is decelerated. At some predetermined desired point in the decelerating speed of the motor vehicle, it will be apparent that the governor F will permit spring 80 to move lever 79 in a counterclockwise position, the cam 97 being also actuated by spring 101 to cause roller 84 to move from notch 100 to notch 99 and thereby manipulate the transmission back to its second speed setting. Likewise on further deceleration of the motor vehicle, the roller 84 will be positioned into engagement with the first speed notch 98 to manipulate the transmission into its first speed setting in response to the action of governor F. In the event of a very sudden deceleration of the motor vehicle it will be apparent that the roller 84 will quickly move from notch 100 to notch 98 so that the transmission will, in such instance, be manipulated from its direct or third speed setting into its first speed setting.

When the motor vehicle is thus decelerated to restore the transmission to the first speed setting illustrated in Fig. 6, it will be apparent that the motor vehicle may be brought to a complete rest by actuation of the usual wheel brakes (not shown) the fluid flywheel B permitting the necessary slippage in the drive between engine A and transmission C, it being remembered that according to the assumed illustration, the first speed brake controlling device 14 is maintained in operative condition. Furthermore if the engine A is idled when the motor vehicle is thus stopped, the fluid clutch B may be arranged, if desired, so that sufficient slippage will occur during such idling condition to relieve the motor vehicle driver of the necessity of maintaining the brakes for the motor vehicle in their applied condition. Ordinarily, when the motor vehicle is brought to a complete rest, the operator will adjust the selector arm 57 into alignment with the neutral stop 63 so as to thereby shift the valve D out of alignment with the governor supply conduit 47 and opposite the neutral space 51. Under such conditions it will be apparent that the pump 34 will merely by-pass its delivery to reservoir 33 by way of the relief valve 41, the oil pressure to the governor control valve E being thereby cut off to relieve the first speed brake controlling device 14.

It will be apparent that the brake controlling devices of the transmission will be under the control of governor F so that the transmission will be automatically manipulated in response to motor vehicle speed whenever the selector arm 57 is aligned with the first speed stop 59. However, whenever the selector arm 57 is adjusted to any of its positions other than the first speed position, the supply of oil to the governor distributor valve E is thereby cut off and the transmission is then manipulated in direct response to manual adjustment of selector arm 57 according to the manual positioning of valve D independently of the operation of governor F.

Furthermore, it will be apparent that whenever the motor vehicle is being driven, the transmission may be immediately brought under the automatic control of the governor by manual manipulation of the selector arm 57 into the first speed position. It will be apparent that such manipulation does not necessarily mean that the transmission C will be actuated in the first speed gear ratio but rather that the control of the transmission is thereby thrown over to the control of the governor so that the setting of the transmission is made to automatically respond to the driving speed of the motor vehicle and governor F. Thus, if the motor vehicle is being driven at a relatively fast speed when the selector arm 57 is adjusted to the first speed setting, the motor vehicle will continue to drive in the third speed in response to the corresponding setting of governor F until the engine is decelerated by release of the engine throttle or by the application of the usual vehicle brakes.

If desired a separate position of adjustment of the selector arm 57 may be provided for establishing supply of fluid pressure to the governor control distributor valve E, although the illustrated arrangement is preferred. When it is desired to operate the motor vehicle in reverse, the vehicle operator adjusts the selector arm 57 into alignment with the reverse notch 62, the distributor valve D being adjusted to directly supply the oil under pressure to the reversing conduit 50 as aforesaid.

Inasmuch as conduits 71, 72 and 73 lead to the fluid actuating mechanism respectively associated with the first, second and third speed brake controlling devices, 14, 15, and 17, and inasmuch as conduits 48 and 49 of valve D also respectively lead to the second and third speed braking devices 15 and 17, it is apparent that some means must be provided to cut off registration of one of the similar pairs of these conduits with its associated distributing valve when the other is under pressure. In other words, let us assume that the selector arm 57 has been manually adjusted for third speed so as to register the outlet 46 of distributor valve D with the third speed supply conduit 49 leading to the third speed brake controlling device 17, and more particularly the operating cylinder 32 thereof, it will be noted that under such conditions the supply of fluid pressure to the governor distributing valve E is cut off, but it will further be noted that the third speed supply conduit 73 of valve E will either be in registration with the low pressure chamber 66 and hence in registration with the reservoir 33 or else the conduit 73 may be in registration with the outlet 70 and hence with the conduit 47 and the return conduit 52 associated with the distributor valve D. Under such conditions the oil pressure supplied by outlet 46 to the third speed conduit 49 would simply be returned to reservoir 33 without producing a pressure in the cylinder 32. In order to prevent such a condition arising I have provided cut off valve controlling means intermediate each of the cylinders associated with the second and third speed brake controlling devices and the respective fluid pressure supply conduits therefor, namely, conduits 48 and 72 leading to the second speed braking device and conduits 49 and 73 leading to the third speed braking device. These cut off valve controlling devices are designated respectively at G and H in Fig. 1.

Referring to Figs. 3 and 4, I have illustrated the construction of one of the cut off controlling valves, the section in Fig. 3 being taken through the cut off valve H. Inasmuch as the details of construction and operation of the cut off valve G are similar to the cut off valve H, only one of these valves is illustrated in detail.

The valve H comprises a casting or body portion 103 having inlet passages 104 and 105 respectively communicating with the third speed supply conduits 73 and 49. The casting 103 is further formed with a cylindrical bore 106 in communication with passages 104 and 105 and a fluid pressure outlet passage 107 which at all times is in communication with a third speed delivery conduit 108 leading to the third speed cylinder 32 for actuating the third speed brake controlling device 17. Operating within cylinder 106 is a cut off control valve 109 normally urged to its neutral or inoperative position illustrated in Fig. 3 by opposed springs 110 and 111, the valve having a transverse fluid passage 112 adapted in the neutral position thereof to establish communication between passage 107 and a passage 113. A relief valve 114 is normally urged by a spring 115 into the position illustrated in Fig. 3 for closing off communication between the passage 113 and a pair of passages 116 and 117 which respectively are in communication with the aforesaid passages 104 and 105. The valve 109 has skirt portions 118 and 119 respectively adapted to close off communication between relief passage 113 and cylinder 106 when valve 109 moves downwardly or upwardly in establishing communication of passage 107 with either passage 104 or passage 105. Rotational displacement of valve 109 is prevented during reciprocation thereof by engagement of a valve stem 120 slidable in a stationary guide 121, the stem 120 and guide 121 being square in cross section as illustrated in Fig. 4. The stem 120 serves to limit upward movement of valve 109 and a downwardly extending stem 122 serves to limit downward movement of the valve.

In operation of the cut off controlling valve H, let it be assumed that the operator actuates the selector arm 57 into the third speed setting aligned with stop 61. In such position the valve D will be actuated so as to deliver fluid under pressure from outlet 46 to the third speed conduit 49. The fluid from the third speed conduit 49 passes to passage 105 and thence to the lower portion of cylinder 106, the fluid pressure acting to move valve 109 upwardly to establish communication between cylinder 106 and the third speed delivery conduit 108, thereby actuating the third speed braking device 17 to establish the third or direct speed through the transmission to the shaft 10. When valve 109 moves upwardly as aforesaid, the skirt portion 119 closes off communication between cylinder 106 and vent passage 113 and furthermore it will be apparent that the conduit 108 is not in communication with the conduit 73 from the governor valve E. In this manner the oil under pressure is supplied to the third speed cylinder 32 without being relieved by supply to the reservoir 33 as would be the case without my cut off control valve H.

In similar manner when the selector arm 57 is aligned with the first speed stop 59 as shown in Fig. 1, the fluid is delivered under pressure to the governor controlling valve E as aforesaid and when the outlet 70 thereof is registered with the conduit 73, the oil pressure will force valve 109 downwardly so as to establish communication between conduits 73 and 108 thereby supplying the oil pressure to cylinder 33 and actuating the third speed brake controlling device 17. During such operation the oil pressure in conduits 73 and 108 are closed off from communication with conduit 49 and the vent 113 is likewise closed by reason of valve skirt 118.

After the oil pressure in cylinder 106 is relieved following actuation of the third speed braking device 17 under control of either of the valves D or E the springs 110 and 111 will restore valve 109 to the neutral or inoperative position illustrated in Fig. 3, and when the oil displaced by the third speed cylinder 32 on expansion of the third speed brake band forces the oil in the opposite direction in conduit 108 toward valve 109, this displacement is accommodated by the relief valve 114 which unseats. When valve 114 unseats, the surplus oil will escape from conduit 108 by reason of the aligned passages 107, 112 and 113, the latter being then in communication with passages 116 and 117 both of which communicate with the reservoir 33 by reason of their respective low pressure valve chambers 66 and 42.

In similar manner the cut off valve controlling device G will selectively establish and control communication between either the conduit 48 of valve D or conduit 72 of valve E with the second speed oil pressure supply conduit 123 leading to the second speed fluid actuating device associated with the brake controlling device 15. The operation of the cut off valve G is similar to that described in reference to the cut off valve H.

Various modifications and changes will be readily apparent from the teachings of my invention, as set forth in the appended claims, and it is not my intention to limit my invention to the particular details of construction and operation shown and described for illustrative purposes.

What I claim is:

1. In a motor vehicle planetary transmission having a plurality of fluid pressure operated forwardly driving speed ratio controlling braking devices, fluid pressure operated means for actuating said braking devices, means responsive to motor vehicle speed for selectively supplying fluid under pressure to said fluid pressure operated means, and manually controlled means for selectively actuating said braking devices to provide the plurality of forwardly driving speed ratios aforesaid independently of actuation thereof by said speed responsive means.

2. In a motor vehicle planetary transmission having a plurality of fluid pressure operated forwardly driving speed ratio controlling braking devices, fluid pressure operated means for actuating said braking devices, means responsive to motor vehicle speed for selectively supplying fluid under pressure to said fluid pressure operated means, and manually controlled means for selectively supplying fluid pressure to said fluid pressure operated means to provide the plurality of forwardly driving speed ratios aforesaid independently of said speed responsive means.

3. In a motor vehicle power transmission having a plurality of fluid pressure operated speed ratio forwardly driving controlling devices, manually controlled fluid pressure distributing means for supplying fluid pressure selectively to said controlling devices, manually operated means for selectively operating said manually controlled distributing means, and speed responsive fluid pressure distributing means for supplying fluid pressure selectively to said controlling devices in response to speed of the motor vehicle, said speed responsive distributing means being rendered inoperative by selective operation of said manually operated means.

4. In a motor vehicle power transmission having a plurality of fluid pressure operated speed ratio controlling devices, manually controlled fluid pressure distributing means for supplying fluid pressure selectively to said controlling devices, manually operated means for selectively operating said manually controlled distributing means, and speed responsive fluid pressure distributing means for supplying fluid pressure selectively to said controlling devices in response to speed of the motor vehicle, said speed responsive distributing means being rendered inoperative in response to a plurality of selective operations of said manually operated means.

5. In a motor vehicle power transmission having a plurality of fluid pressure operated speed ratio controlling devices, manually controlled fluid pressure distributing means for supplying fluid pressure selectively to said controlling devices, manually operated means for selectively operating said manually controlled distributing means, speed responsive fluid pressure distributing means for supplying fluid pressure selectively to said controlling devices in response to speed of the motor vehicle, and fluid pressure conducting means intermediate said speed responsive distributing means and said manually controlled distributing means adapted in response to at least one selective operation of said manually operated means to supply fluid pressure to at least one of said controlling devices from said manually controlled distributing means.

6. In a motor vehicle power transmission having a plurality of fluid pressure operated speed ratio controlling devices, manually controlled fluid pressure distributing means for supplying fluid pressure selectively to said controlling devices, manually operated means for selectively operating said manually controlled distributing means, speed responsive fluid pressure distributing means for supplying fluid pressure selectively to said controlling devices in response to speed of the motor vehicle, and fluid pressure conducting means intermediate said speed responsive distributing means and said manually controlled distributing means adapted in response to at least one selective operation of said manually operated means to supply fluid pressure to at least one of said controlling devices from said manually controlled distributing means, said intermediate fluid pressure conducting means being closed in response to other selective operations of said manually operated means.

7. In a motor vehicle power transmission having a plurality a fluid pressure operated speed ratio controlling devices, a plurality of independently operable fluid pressure distributing means, means including a common conduit for conducting fluid pressure selectively from said plurality of distributing means to one of said controlling devices, and means responsive to operation of one of said distributing means to supply fluid pressure to the last said controlling device for closing communication between another of said distributing means with the last said controlling device.

8. In a motor vehicle transmission of the planetary gear type having a plurality of fluid pressure operated speed ratio controlling braking devices, vehicle speed responsive means including a distributor valve for selectively supplying fluid under pressure to said braking devices, and manually operable means including a distributor valve for selectively supplying fluid under pressure to said braking devices independently of the first said distributor valve.

9. In a motor vehicle transmission of the planetary gear type having a plurality of fluid pressure operated speed ratio controlling braking devices, vehicle speed responsive means including a distributor valve for selectively supplying fluid under pressure to said braking devices, manually operable means including a distributor valve for selectively supplying fluid under pressure to said braking devices independently of the first said distributor valve, and means for supplying fluid pressure to the second said distributor valve from, and in response to operation of, the first said distributor valve.

10. In a motor vehicle transmission of the planetary gear type having a plurality of fluid pressure operated speed ratio controlling braking devices, vehicle speed responsive means including a distributor valve for selectively supplying fluid under pressure to said braking devices, manually operable means including a distributor valve for selectively supplying fluid under pressure to said braking devices independently of the first said distributor valve, means for supplying fluid pressure to the second said distributor valve from, and in response to operation of, the first said distributor valve, and a plurality of fluid pressure supply conduits between each of said distributor valves and certain of said braking devices.

11. In a motor vehicle transmission of the planetary gear type having a plurality of fluid pressure operated speed ratio controlling braking devices, vehicle speed responsive means including a distributor valve for selectively supplying fluid under pressure to said braking devices, manually operable means including a distributor valve for selectively supplying fluid under pressure to said braking devices independently of the first said distributor valve, means for supplying fluid pressure to the second said distributor valve from, and in response to operation of, the first said distributor valve, and a plurality of fluid pressure supply conduits between each of said distributor valves and certain of said braking devices, one of said braking devices being adapted to receive fluid pressure supply only from the second said distributor valve.

12. In a motor vehicle transmission of the planetary gear type having a plurality of fluid pressure operated speed ratio controlling braking devices, vehicle speed responsive means including a distributor valve for selectively supplying fluid under pressure to said braking devices, manually operable means including a distributor valve for selectively supplying fluid under pressure to said braking devices independently of the first said distributor valve, means for supplying fluid pressure to the second said distributor valve from, and in response to operation of, the first said distributor valve, a plurality of fluid pressure supply conduits between each of said distributor valves and certain of said braking devices, and means for venting the last said braking devices and including valve controlling means selectively responsive to operation of said distributor valves.

13. In a motor vehicle transmission including a plurality of speed ratio controlling devices, manually controlled selector means for manipulating the transmission to selectively provide neutral, reverse, and any one of a plurality of forward driving speeds, speed responsive means for manipulating the transmission to provide forward driving speed ratios, and means responsive to manual setting of said selector means in providing one of said plurality of forward driving speeds for rendering said speed responsive means operative to manipulate the transmission to provide the remainder of said plurality of forward driving speeds.

14. In a motor vehicle transmission including a plurality of speed ratio controlling devices, manually controlled selector means for manipulating the transmission to provide neutral, reverse, and a plurality of forward driving speeds, speed responsive means for manipulating the transmission to provide forward driving speed ratios, means responsive to manual setting of said selector means in providing one of said plurality of forward driving speeds for rendering said speed responsive means operative to manipulate the transmission to provide the remainder of said plurality of forward driving speeds, and means responsive to manual setting of said selector means in providing another of said plurality of forward driving speeds for rendering said speed responsive means inoperative.

15. In a motor vehicle transmission including a plurality of speed ratio controlling devices, manually controlled selector means for manipulating the transmission to provide neutral, reverse, and a plurality of forward driving speeds, speed responsive means for manipulating the transmission to provide forward driving speed ratios, and means responsive to manual setting of said selector means in providing one of said plurality of forward driving speeds for rendering said speed responsive means operative to manipulate the transmission to provide the remainder of said plurality of forward driving speeds, said selector means being operable to provide one of said plurality of forward driving speeds only through the intermediary of said speed responsive means.

16. In a motor vehicle transmission including a plurality of speed ratio controlling devices, manually controlled selector means for manipulating the transmission to provide neutral, reverse, and a plurality of forward driving speeds, speed responsive means for manipulating the transmission to provide forward driving speed ratios, and means responsive to manual setting of said selector means in providing one of said plurality of forward driving speeds for rendering said speed responsive means operative to manipulate the transmission to provide the remainder of said plurality of forward driving speeds, said selector means being operable to provide one of said plurality of forward driving speeds only through the intermediary of said speed responsive means, said selector means being operable to provide another of said plurality of forward driving speeds independently of said speed responsive means.

17. In a motor vehicle transmission having a plurality of speed ratio controlling devices, speed responsive means for selectively operating said devices and including a governor structure, a governor operated selector structure, a pivoted lever operably connected to one of said structures and having a cam face formed with steps located at relatively different distances from the lever pivot, a second pivoted lever operably connected to the other of said structures and having a portion carried thereby adapted for selective operative engagement with the steps of said cam.

18. In a motor vehicle transmission having a plurality of fluid pressure operated speed ratio controlling devices, a pair of valving means for supplying fluid under pressure to said devices, means for venting one of said devices subject to fluid pressure supply selectively from said valving means, and means responsive to fluid pressure supply from either of said valving means to the last said device for closing said venting means for the duration of fluid pressure supply to the last said device.

HERBERT F. PATTERSON.